United States Patent [19]

Aizawa et al.

[11] Patent Number: 5,228,588
[45] Date of Patent: Jul. 20, 1993

[54] THICKNESS-REDUCED DEEP-DRAW-FORMED CAN

[75] Inventors: Masanori Aizawa, Yokohama; Tetsuo Miyazawa, Ayase; Katsuhiro Imazu; Seishichi Kobayashi, both of Yokohama; Hiroshi Ueno, Yokosuka, all of Japan

[73] Assignee: Toyo Seikan Kaisha Ltd., Tokyo, Japan

[21] Appl. No.: 841,290

[22] PCT Filed: Feb. 16, 1990

[86] PCT No.: PCT/JP90/00189
§ 371 Date: Dec. 12, 1990
§ 102(e) Date: Dec. 12, 1990

[87] PCT Pub. No.: WO90/09321
PCT Pub. Date: Aug. 23, 1990

Related U.S. Application Data

[63] Continuation of Ser. No. 582,856, Dec. 12, 1990, abandoned.

[30] Foreign Application Priority Data

Feb. 16, 1989 [JP] Japan .................. 1-35004

[51] Int. Cl.⁵ .............................. B27N 5/02
[52] U.S. Cl. ........................ 220/458; 72/46
[58] Field of Search .......... 220/458; 428/35.8, 35.9; 72/46

[56] References Cited

U.S. PATENT DOCUMENTS

| | | | |
|---|---|---|---|
| 3,750,827 | 8/1973 | Wick | 220/458 |
| 4,054,227 | 10/1977 | Saunders | 220/458 |
| 4,143,790 | 3/1979 | Ueno et al. | 220/458 |
| 4,278,716 | 7/1981 | Buchner et al. | 428/35.8 |
| 4,405,058 | 9/1983 | Phalin | 220/458 |
| 4,452,374 | 6/1984 | Hitchcock et al. | 220/458 |
| 4,734,303 | 3/1988 | Fujiwara et al. | 428/35.9 |
| 4,875,597 | 10/1989 | Saunders | 220/458 |
| 4,900,594 | 2/1990 | Quick et al. | 428/481 |
| 4,962,659 | 10/1990 | Imazu et al. | |
| 4,980,210 | 12/1990 | Heyes | 428/35.9 |
| 4,984,708 | 1/1991 | Imazu et al. | |

FOREIGN PATENT DOCUMENTS 297 5/1979 World Int. Prop. O. ......... 220/458

OTHER PUBLICATIONS

Kenji Kato, "Kinzoku Sosei Kakogaku" (Plastic Working of Metals), Jun. 25, 1971 with appropriate English language translation, pp. 1–10.

Primary Examiner—Allan N. Shoap
Assistant Examiner—S. Castellano
Attorney, Agent, or Firm—Sughrue, Mion, Zinn, Macpeak & Seas

[57] ABSTRACT

Disclosed is a thickness-reduced deep-draw-formed can formed of a metal plate having an organic coating. In this can, at least the inner surface organic coating is composed of a crystalline thermoplastic resin, the thickness of the barrel wall is made smaller than the thickness of the bottom, the thermoplastic resin of the barrel wall is molecularly oriented mainly in the axial direction, and the roughness of the metal surface of the barrel wall is larger than that of the metal surface of the bottom. Since the organic coating is crystalline and is molecularly oriented, the coating can resist processing deformation when the thickness is reduced by deep-draw forming and the coating is not damaged by a tool or the like at all, and therefore, the barrier property to corrosive components and the heat resistance are prominently improved.

10 Claims, 7 Drawing Sheets

THICKNESS-REDUCED DEEP-DRAW-FORMED CAN

This is a continuation of application No. 07/582,856 filed Dec. 12, 1990 now abandoned.

TECHNICAL FIELD

The present invention relates to a thickness-reduced deep-draw-formed can prepared from a metal plate having an organic coating.

TECHNICAL BACKGROUND

As the conventional side seamless can, there can be mentioned a product formed by subjecting a metal blank such as an aluminum plate, a tinplate or a tin-free steel plate to an ironing operation in at least one stage between a drawing die and a punch to form a cup comprising a side seamless barrel and a bottom connected integrally and seamlessly to the barrel, and if desired, subjecting the barrel to an ironing operation between an ironing punch and an ironing die to reduce the thickness of the barrel of the vessel. It also is known that the thickness of the side wall can be reduced by bending-elongation by a curvature corner portion of the redrawing die instead of the above-mentioned ironing operation (see Japanese Unexamined Patent Publication No. 56-501442).

In order to save a vessel material and prepare a can having a large can height from a certain quantity of a metal blank, it is preferred that the thickness of a barrel portion of a vessel be reduced by ironing or by bending elongation.

As the method for forming an organic coating on a side seamless can, there can be mentioned not only a method broadly adopted in the art, in which an organic paint is applied to a formed can, but also a method in which a resin film is laminated on a metal blank before the forming. As an example of the latter method, Japanese Examined Patent Publication No. 59-34580 proposes a method in which a metal plate laminated with a film of a polyester derived from terephthalic acid and tetramethylene glycol is used. It also is known that in the production of a redraw-formed can by bending elongation, a metal plate coated with a vinyl organosol, epoxy, phenolic, polyester or acrylic paint can be used.

However, the conventional method for the production of a coated can having a thickness-reduced side wall is defective in that the corrosion resistance of an organic coating applied to a metal plate in advance is drastically degraded by the forming operation.

More specifically, the organic coating is readily damaged by a tool diring the side wall thickness-reducing forming operation, apparent or latent exposure of the metal is caused at the damaged part of the coating, and elution of the metal or corrosion is caused from this damaged part. In the production of a seamless can, there is produced such a plastic flow as increasing the size in the height direction of a can and diminishing the size in the circumferential direction of the can, and by this plastic flow, the adhesive force between the surface of the metal and the organic coating is reduced, and furthermore, this adhesive force is reduced with the lapse of time by the residual strain in the organic coating. This tendency becomes conspicuous when a content is hot-filled in the can or the filled can is subjected to heat sterilization at a low or high temperature.

It is therefore a primary object of the present invention to provide a side wall thickness-reduced deep-draw-formed can from a metal plate having an organic coating, which has an excellent coating completeness, an excellent adhesion of the coating, an excellent corrosion resistance and an excellent heat resistance.

Another object of the present invention is to provide a side wall thickness-reduced deep-draw-formed can, in which although the can is prepared from a metal plate having an organic coating, the adhesive force between the organic coating and the metal surface is prominently improved and as the result, an excellent combination of corrosion resistance and heat resistance is attained.

DISCLOSURE OF THE INVENTION

In accordance with the present invention, there is provided a deep-draw-formed metal can prepared from a metal plate having an organic coating, wherein at least an organic coating on the inner surface is composed of a crystalline thermoplastic resin, the thickness of a barrel wall is reduced as compared with the thickness of a bottom, the thermoplastic resin on the barrel wall is molecularly oriented mainly in the axial direction, and the roughness of the metal surface of the barrel wall is larger than that of the metal surface of the bottom.

In the deep-draw-formed can of the present invention, it is preferred that the average roughness of the metal surface of the barrel wall be at least 1.5 times, especially 1.5 to 5.0 times, the average roughness of the metal surface of the bottom, and the metal surface of the barrel wall be such a rough surface that pitches between the peak and trough is 0.02 to 1.5 μm, especially 0.02 to 1.0 μm. It also is preferred that the thermoplastic resin on the barrel wall be molecularly oriented so that the orientation degree as determined by the X-ray diffraction method is at least 30%, especially at least 35%, and that the thermoplastic resin on the barrel wall should have a crystallinity of at least 15%, especially 20 to 70%, as determined by the density method.

The deep-draw-formed can of the present invention is prepared frqm a metal plate having an organic coating and the thickness of the barrel wall is reduced as compared with the thickness of the bottom, and the deep-draw-formed can of the present invention is characterized in that at least the organic coating on the inner surface is composed of a crystalline thermoplastic resin and this thermoplastic resin on the barrel wall is molecularly oriented mainly in the axial direction, and the roughness of the metal surface of the barrel wall is larger than that of the metal surface of the bottom.

In order to improve the corrosion resistance and heat resistance of the coating per se, it is important that the organic coating should be crystalline and be molecularly oriented. In general, permeation of various components through an organic resin is caused through an amorphous portion in the resin. In the present invention, since a crystalline thermoplastic resin is used for the resin coating and this thermoplastic resin is oriented and crystallized, the barrier property to corrosive components can be prominently improved. If a highly crystalline resin is used and the resin is highly molecularly oriented, the heat resistance of the coating per se is prominently improved over the heat resistance of a coating of an amorphous or unoriented resin. Still further, if the organic coating is formed of a crystalline thermoplastic resin, by dint of the combination of high strength and high elongation possessed by the resin, even if the thickness of the resin-coated metal plate is reduced by deep-draw forming, the coating can show such a processability that the coating can be processed exactly in follow-up with the metal blank, and the coating is not damaged by a tool or the like.

In the deep-draw-formed can of the present invention, although the barrel wall and the bottom are formed of the same metal plate having an organic coating, the roughness of the metal surface of the barrel wall is larger than that of the metal surface of the bottom, and by the combination of this roughness characteristic of the metal surface with the above-mentioned molecularly oriented crystalline resin coating, the adhesion is prominently improved. Namely, since the metal surface of the barrel wall is greatly roughened and the organic resin coating covering this metal surface is molecularly oriented, fine convexities and concavities (peaks and troughs) on the metal surfaces are anchored in the oriented resin layer and the adhesion is prominently improved by this anchoring effect. Hereupon, it must be noted that even if fine convexities and concavities are formed on the metal surface, when the resin layer contiguous to the metal surface is molecularly oriented, the adhesion-improving effect is much higher than the effect attained when the resin layer is not molecularly oriented (unoriented).

An adhesive can be applied so as to improve the adhesive force between the crystalline organic resin and metal surface. In this case, the fine convexities and concavities on the metal surface are anchored in the adhesive layer to increase the adhesive force, and by the combination of this adhesive layer with the thermally set, molecularly oriented crystalline resin, the heat resistance and corrosion resistance are further improved.

In general, the corrosion resistance of a metal plate having an organic coating is greatly influenced by the degree of the adhesion between the organic coating and the metal surface. If the degree of the adhesion of the coating is insufficient, under-film corrosion is advanced at this part of the insufficient adhesion. In the present invention, since the adhesion of the coating is very tight, under-film corrosion is prevented, and furthermore, even if necking or flanging is further conducted, the corrosion resistance is highly improved.

This prominent improvement of the adhesion between the organic coating and metal surface results in unexpected advantages with respect to prevention of reduction of the adhesive force with the lapse of time and improvement of the heat resistance. Namely, a molecularly oriented resin coating generally tends to shrink in the orientation direction when heated, and this results in degradation of the thermal stability of the coating and increase of the peeling tendency with the lapse of time. In contrast, in the coated deep-draw-formed can of the present invention, since the molecularly oriented coating is heated in the state tightly bonded and fixed to the metal surface and a certain kind of heat setting is effected, reduction of the adhesive force with the lapse of time is prevented and the heat resistance is improved.

PREFERRED EMBODIMENTS OF THE INVENTION

Figure 1:
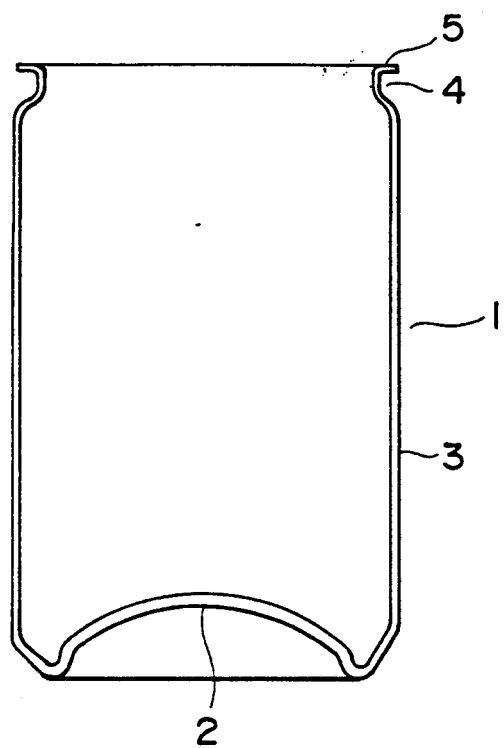
FIG. 1 is a diagram illustrating an embodiment of the deep-draw-formed can of the present invention.

Referring to FIG. 1 illustrating one embodiment of the deep-draw-formed can of the present invention, this deep-draw-formed can 1 is prepared by deep-draw forming (drawing-redrawing) of a metal plate having an organic coating and comprises a bottom 2 and a side wall 3. A flange 5 is formed on the top end of the side wall 3, if desired, through a neck 4. In this can 1, the thickness of the side wall 3 is reduced below the thickness of the bottom 2 by bending elongation.

Figure 2A:
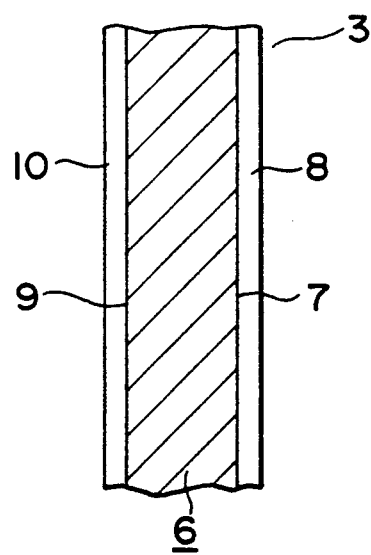
FIGS. 2A and 2B are diagrams illustrating examples of the side wall portion.
Figure 2B:
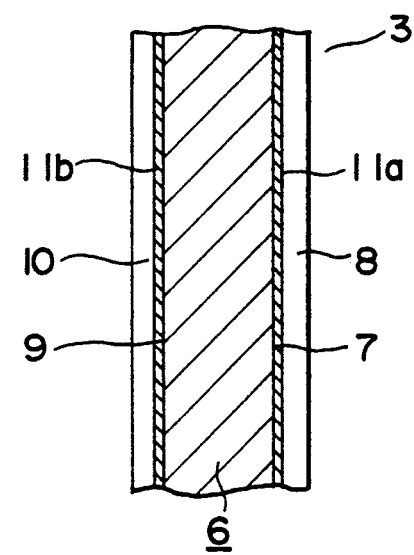

Referring to FIG. 2A illustrating an example of the sectional structure of the side wall 3, this side wall 3 comprises a metal substrate 6, an inner face resin film coating 8 formed on the inner surface 7 of the metal substrate 6 and an outer surface coating 10 formed on the other surface 9 of the metal substrate 6. Referring to FIG. 2B illustrating another example of the sectional structure, this sectional structure is the same as the sectional structure shown in FIG. 2A except that adhesive layers 11a and 11b are interposed between the surface 7 of the metal substrate and the inner face organic coating 8 and between the metal surface 9 and the outer face organic coating 10, respectively.

In each example, the sectional structure of the bottom 2 is the same as the sectional structure of the side wall 3 except the following points.

The deep-draw-formed can of the present invention is characterized in that the metal surfaces 7 and 9 of the side wall have a larger roughness than the metal surface of the bottom, and of the coatings 8 and 10, at least the inner face coating 8 is composed of a crystalline thermoplastic resin and is molecularly oriented mainly in the axial direction (height direction) of the can.

Figure 3:
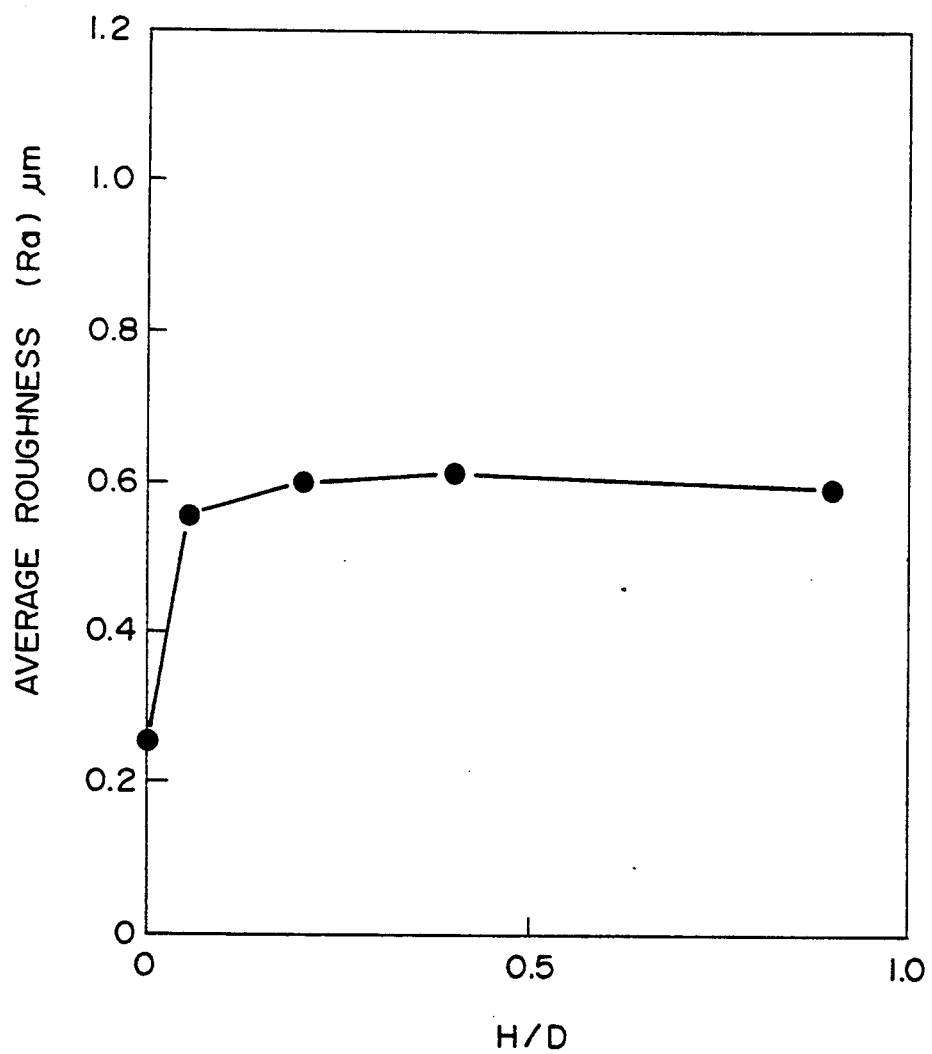
FIG. 3 is a graph showing the relation between the average roughness and the can height direction (can height H/can diameter D) in the bottom and side wall of the can, observed with respect to a typical instance (Example 1 given hereinafter) of the deep-draw-formed can of the present invention.

In FIG. 3, the relation between the average roughness and the can height direction (can height H/can diameter) in the bottom and side wall of the can is plotted with respect to a typical instance (see Example 1 given hereinafter) of the deep-draw-formed can of the present invention. From FIG. 3, it is seen that in the thickness-reduced deep-draw-formed can of the present invention, the average roughness of the metal surface of the side wall is larger than the average roughness of the metal surface of the bottom and the average surface (Ra) of the metal surface of the side wall is at least 1.5 times, especially 1.5 to 5.0 times, the average roughness of the metal surface of the bottom. In the present invention, by reducing the thickness so that the average roughness of the metal surface of the side wall is within the above-mentioned range, the adhesion of the resin coating can be prominently improved. If the value of the average roughness is too small and below the above-mentioned range, the improvement of the adhesion is smaller than in the present invention. Processing of reducing the thickness of the side wall so that the average roughness of the metal surface is increased is exceptional one. This unexceptionality will be understood from the fact that in case of draw-ironing processing, which is a typical instance of the thickness-reducing processing, the average roughness of the metal surface of the side wall is substantially equal to or rather smaller than the average roughness of the metal surface of the bottom.

Figure 4A:
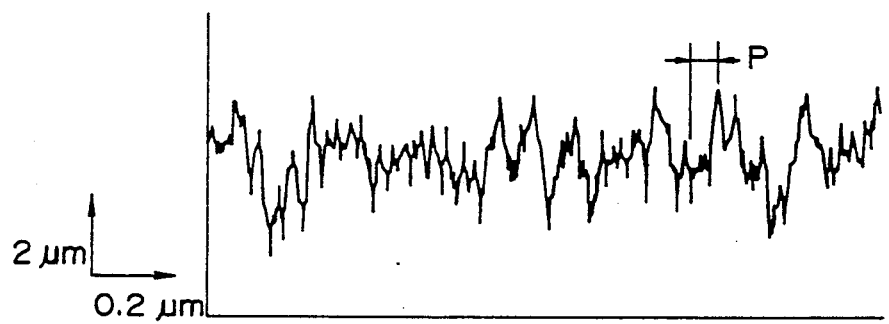
FIG. 4A shows a height/roughness curve of the metal surface determined in the height direction in the vicinity of a certain height with respect to the deep-draw-formed can shown in FIG. 3.
Figure 4B:
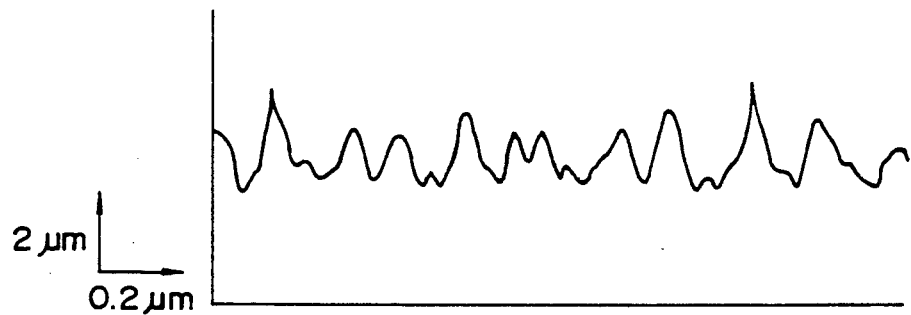
FIG. 4B is a height-/roughness curve of the surface determined with respect to the deep-draw-formed can shown in FIG. 3 where the resin coating layer is formed.

FIG. 4A shows a surface height-roughness curve of the metal surface measured in the vicinity of the height direction at a certain height with respect to the deep-draw-formed can shown in FIG. 3. From FIG. 4A, it is seen that there is present a substantially constant pitch (P) between the peak and trough on the rough surface and this pitch is in the range of from 0.02 to 1.5 μm, especially from 0.02 to 1.0 μm. FIG. 4B shows a surface height-roughness curve determined with respect to the same deep-draw-formed can where the resin coating layer is formed. It is seen that the pitch between the peak and trough becomes more constant.

This pitch has a relation to the radius of curvature for bending elongation, described in detail hereinafter, and for the adhesion between the coating and the metal surface, it is important that the pitch width should be within the above-mentioned range. If the pitch is below the above-mentioned range or exceeds the above-mentioned range, the adhesive force is smaller than in the present invention.

It is indispensable that the thermoplastic resin constituting the coating should be sufficiently crystalline. The crystallinity of a resin is determined by the density method. In the present invention, it is preferred that the crystallinity calculated according to the following formula based on the density measured by the density gradient tube method:

$$Xv = \frac{(\rho - \rho_a)}{(\rho_c - \rho_a)} \times 100 \quad (1)$$

wherein $\rho$ represents the measured density (g/cm$^3$), $\rho_a$ represents the density of a completely amorphous polymer, and $\rho_c$ represents the density of a completely crystalline polymer, be at least 15%, especially 20 to 70%. If this density method crystallinity is too low and below the above-mentioned range, apparent or latent metal exposure is caused at the deep-draw forming step, or the corrosion resistance or heat resistance of the coating is degraded.

Figure 5:
FIG. 5 is an X-ray diffraction photo obtained when X-ray are projected in the vertical direction on the resin coating of a typical instance of the deep-draw-formed can of the present invention.
Figure 6:
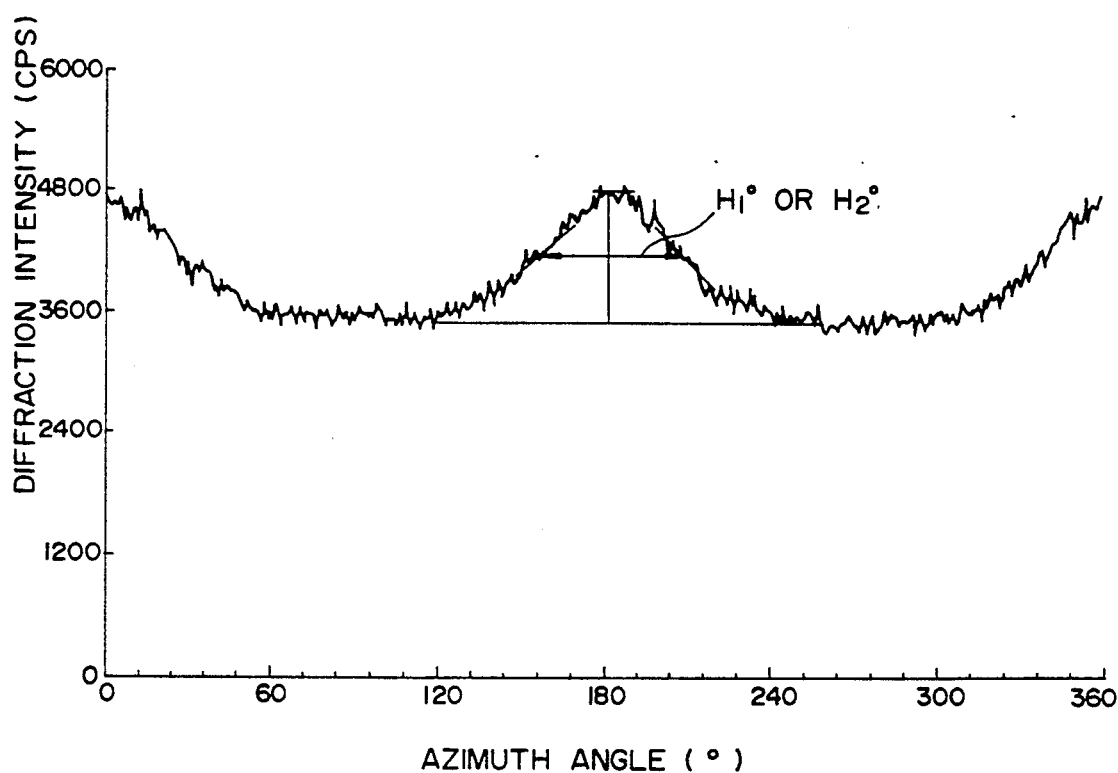
FIG. 6 is a diffraction intensity curve determined with respect to the photo of FIG. 5.

This resin coating is effectively molecularly oriented mainly in the axial direction of the can. FIG. 5 is an X-ray diffraction photo obtained when X-rays are applied vertically to the resin coating of a typical instance (Example 1 given hereinafter), and from this photo, it is seen that prominent interference spots by the molecular orientation in the axial direction of the can appear. FIG. 6 is a diffraction intensity distribution curve obtained with respect to the photo of FIG. 5.

The monoaxial orientation degree of the resin covering can be evaluated based on the average orientation degree defined by the following formula:

$$F = \frac{1}{2} \times \left( \frac{180° - H_1°}{180°} + \frac{180° - H_2°}{180°} \right) \times 100 (\%) \quad (2)$$

wherein $H_1$. and $H_2$. represent half widths (.) of the diffraction intensity distribution curve (FIG. 6) along the Debye-Scherrer ring of the strongest diffraction plane [(010)] measured by the transmission method using CuKα rays.

Figure 7:
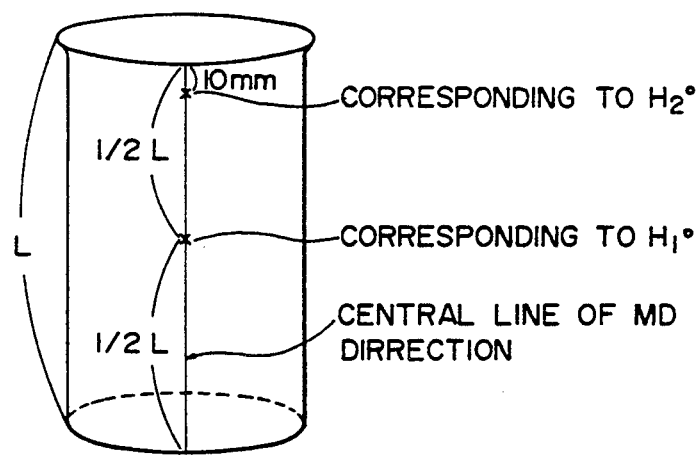
FIG. 7 is a diagram illustrating the position of a resin film for measurement of the degree of the monoaxial orientation of the resin coating.

The measurement positions of the coating film corresponding to $H_1$. and $H_2$. are the central part of the can barrel wall on the center line of the MD direction of the coated plate for $H_1°$ and the point distance by 10 mm from the top end of the can on the center line of the MD direction of the coated plate for $H_1°$ (see FIG. 7).

The coated film is sampled in the following manner. Namely, a small piece of the metal plate having a size of 40 mm×40 mm is cut out with the predetermined measurement position being as the center, and the outer surface coating is removed by using emery paper. Then, the metal is dissolved in 6N hydrochloric acid and the coating film is isolated.

In the present invention, in view of the adhesion of the coating to the metal surface and the corrosion resistance and heat resistance of the coating, it is preferred that the orientation degree of the coating be at least 30%, especially 35 to 90%.

Various surface-treated steel plates and plates of light metals such as aluminum can be used as the metal plate in the present invention.

A steel plate formed by annealing a cold-rolled steel plate, subjecting the annealed steel plate to secondary cold rolling and subjecting the steel plate to at least one of zinc deposition, tin deposition, nickel deposition, electrolytic chromate treatment and chromate treatment can be used as the surface-treated steel plate. An electrolytically chromate-treated steel plate is preferably used as the surface-treated steel plate, and an electrolytically chromate-treated steel plate comprising 10 to 200 mg/m$^2$ of a metallic chromium layer and 1 to 50 mg/m$^2$ (as calculated as metallic chromium) of a chromium oxide layer is especially preferably used. This surface-treated steel plate is excellent in the combination of the adhesion of the coating and the corrosion resistance. Another example of the surface-treated steel plate is a tinplate having a deposited tin amount of 0.5 to 11.2 g/m$^2$. Preferably, this tinplate is subjected to a chromate treatment or a chromate/phosphate treatment so that the chromium amount as calculated as metallic chromium is 1 to 30 mg/m$^2$.

Still another example of the surface-treated steel plate is an aluminum-coated steel plate formed by deposition of aluminum or pressure welding of aluminum.

As the light metal plate, there can be used not only a so-called pure aluminum plate but also an aluminum alloy plate. An aluminum alloy having excellent corrosion resistance and processability comprises 0.2 to 1.5% by weight of Mn, 0.8 to 5% by weight of Mg, 0.25 to 0.3% by weight of Zn and 0.15 to 0.25% by weight of Cu, with the balance being Al. It is preferred that the light metal plate be subjected to a chromate treatment or a chromate/phosphate treatment so that the chromium amount as calculated as metallic chromium is 20 to 300 mg/m².

The blank thickness ($t_B$) of the metal plate, that is, the thickness of the bottom, differs according to the kind of the metal and the use or size of the vessel, but it is generally preferred that the blank thickness be 0.10 to 0.50 mm, especially 0.10 to 0.30 mm in case of a surface-treated steel plate or 0.15 to 0.40 mm in case of a light metal plate.

Any of thermoplastic resins that can be drawn at the thickness-reducing processing and can finally have the above-mentioned crystallinity can be used as the inner surface coating. For example, there can be used films of olefin resins such as polyethylene, polypropylene, an ethylene/propylene copolymer, an ethylene/vinyl acetate copolymer, an ethylene/acrylic ester copolymer and an ionomer, films of polyesters such as polyethylene terephthalate, polybutylene terephthalate, an ethylene terephthalate/isophthalate copolymer, ethylene terephthalate/adipate copolymer, an ethylene terephthalate/sebacate copolymer and a butylene terephthalate/isophthalate copolymer, films of polyamides such as nylon 6, nylon 6,6, nylon 11 and nylon 12, a polyvinyl chloride film, and a polyvinylidene chloride film, so far as the abovementioned requirements are satisfied.

Either an undrawn film or a biaxially drawn film can be used, and it is preferred that the thickness of the film be 3 to 50 μm, especially 5 to 40 μm. Lamination of the film to the metal plate is performed according to the heat fusion bonding method, the dry lamination method, the extrusion coating method or the like. In the case where the adhesiveness (heat fusion bondability) between the film and the metal plate is poor, an adhesive such as a urethane adhesive, an epoxy adhesive, an acid-modified olefin resin adhesive, a copolyamide adhesive or a copolyester adhesive can be interposed between the film and the metal plate.

The thickness of the adhesive layer is preferably 0.1 to 5 μm, but a thickness not inhibiting the molecular orientation of the crystalline thermoplastic resin can be optionally selected and used.

The outer surface coating can be the same as or different from the inner surface coating. In the latter case, a protecting paint can be used. As the protecting paint, there can be used optional protecting paints composed of thermosetting and thermoplastic resins, for example, modified epoxy paints such as a phenol/epoxy paint and an amino/epoxy paint, vinyl and modified vinyl paints such as a vinyl chloride/vinyl acetate copolymer, a partially saponified vinyl chloride/vinyl acetate copolymer, a vinyl chloride/vinyl acetate/maleic anhydride copolymer and epoxy-modified, epoxyamino-modified and epoxyphenol-modified vinyl paints, acrylic resin paints, and synthetic rubber paints such as a styrene/butadiene copolymer. These protecting paints can be used singly or in the form of a mixture of two or more of them.

The paint can be applied in the form of an organic solvent solution such as an enamel or lacquer or an aqueous solution or dispersion to the metal blank by roller coating, spray coating, dip coating, electrostatic coating, electrophoretic coating or the like. If the resin paint is thermosetting, the paint is baked according to need. From the viewpoint of the corrosion resistance and processability, it is preferred that the thickness (dry state) of the protecting coating be 2 to 30 μm, especially 3 to 20 μm. A lubricant can be incorporated into the coating so as to improve the draw-redraw formability.

In order to hide the metal plate and assist the transfer of a blank holder force to the metal plate at the draw-redraw forming step, an inorganic filler (pigment) can be incorporated in the outer surface coating or film used in the present invention.

As the inorganic filler, there can be mentioned inorganic white pigments such as rutile or anatase titanium dioxide, zinc flower and gloss white, white extender pigments such as baryta, precipitated baryta sulfate, calcium carbonate, gypsum, precipitated silica, aerosil, talc, fired or unfired clay, barium carbonate, alumina white, synthetic or natural mica, synthetic calcium silicate and magnesium carbonate, black pigments such as carbon black and magnetite, red pigments such as red iron oxide, yellow pigments such as sienna, and blue pigments such as prussian blue and cobalt blue. The inorganic filler can be incorporated in an amount of 10 to 500% by weight, especially 10 to 300% by weight, based on the resin.

In the present invention, the roughness of the metal surface of the side wall and the molecular orientation of at least the inner surface coating are attained at the step of thickness reduction and deep-draw forming of the metal plate having an organic coating. More specifically, according to the present invention, in the process comprising holding a preliminarily drawn cup of a coated metal plate by an annular holding member inserted in the cup and a redrawing die, and relatively moving a redrawing punch, which is arranged coaxially with the holding member and the redrawing die so that the redrawing punch can come into the holding member and come out therefrom, and the redrawing die so that the redrawing punch and the redrawing dye are engaged with each other, to draw-form the preliminarily drawn cup into a deep-draw-formed cup having a diameter smaller than the diameter of the preliminarily drawn cup, at the step of the redraw forming of the preliminarily drawn cup, the redraw forming and bending elongation are carried out at a temperature at which the molecular orientation of the thermoplastic resin is effectively attained, so that bending elongation of the coated metal plate is effectively accomplished at the working corner of the redrawing die and the above-mentioned roughness is formed on the metal surface by this bending elongation.

Namely, by adjusting the temperature of the thermoplastic resin at the redrawing step at a level higher than the glass transition point (Tg) but lower than the melting point (mp), an effective molecular orientation is given to the resin coating at the bending elongation.

Figure 8:
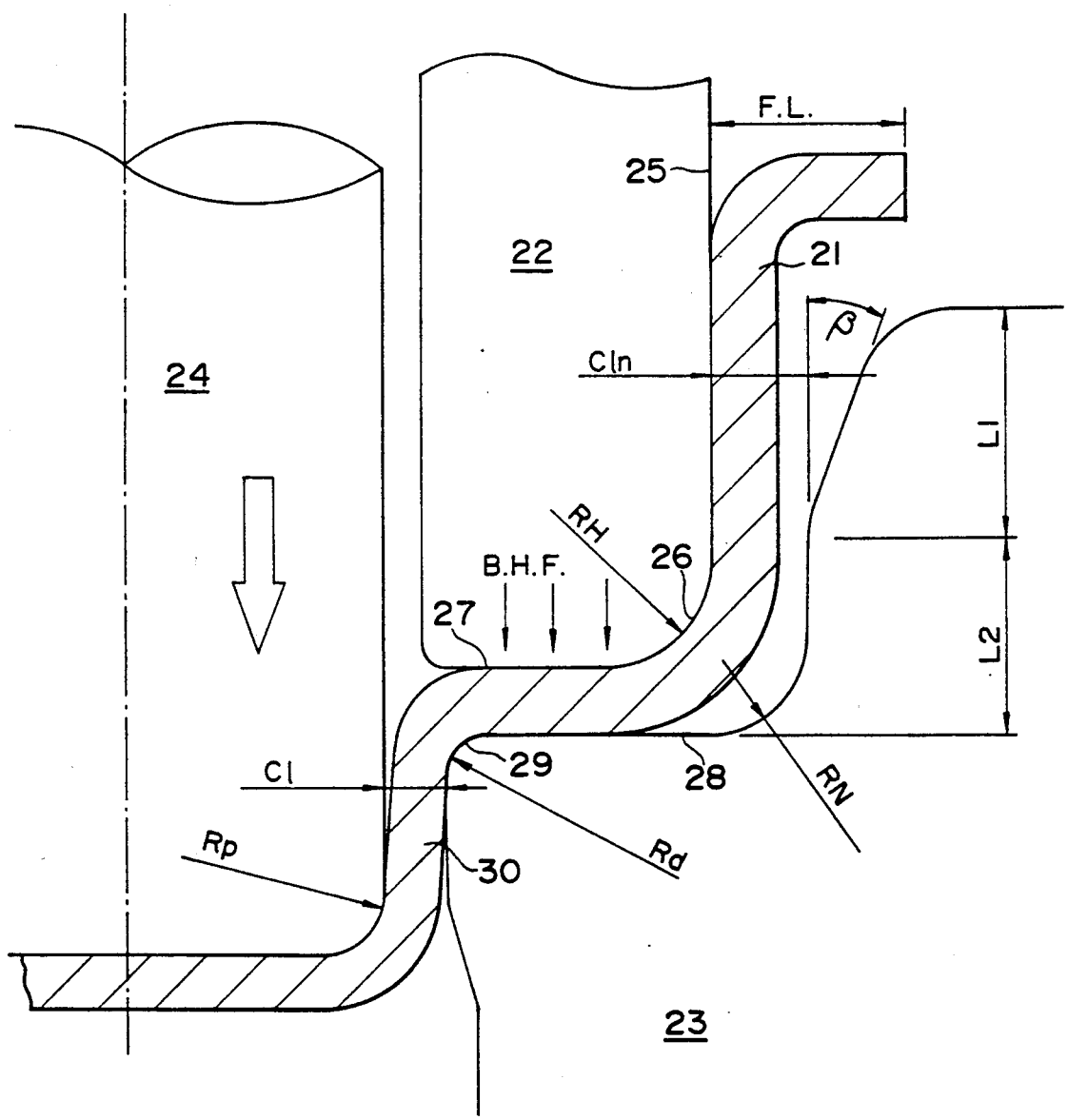
FIG. 8 is a diagram illustrating the redrawing method.

Referring to FIG. 8 illustrating the redrawing process, a preliminarily drawn cup 21 formed of a coated metal plate is held by an annular holding member 22 inserted in the cup 21 and a redrawing die 23 located below. A redrawing punch 24 is arranged coaxially with the holding member 22 and redrawing die 23 so that the redrawing punch can come into the holding member 22 and come out therefrom. The redrawing punch 24 and redrawing die 23 are relatively moved so that they are engaged with each other.

By this relative movement, the side wall of the preliminarily drawn cup is vertically bent inwardly with respect to the radius by an outer circumferential face 25 of the annular holding member 22 through a curvature corner portion thereof, and the side wall of the cup 21 is passed through a portion defined by an annular bottom face 27 of the annular holding member 22 and a top face 28 of the redrawing die 23 and is bent substantially vertically to the axial direction by a working corner portion of the redrawing die 23, whereby a deep-draw-formed cup 30 having a diameter smaller than the diameter of the preliminarily drawn cup 21 is prepared and simultaneously, the thickness of the side wall is reduced by the bending elongation.

Figure 9:
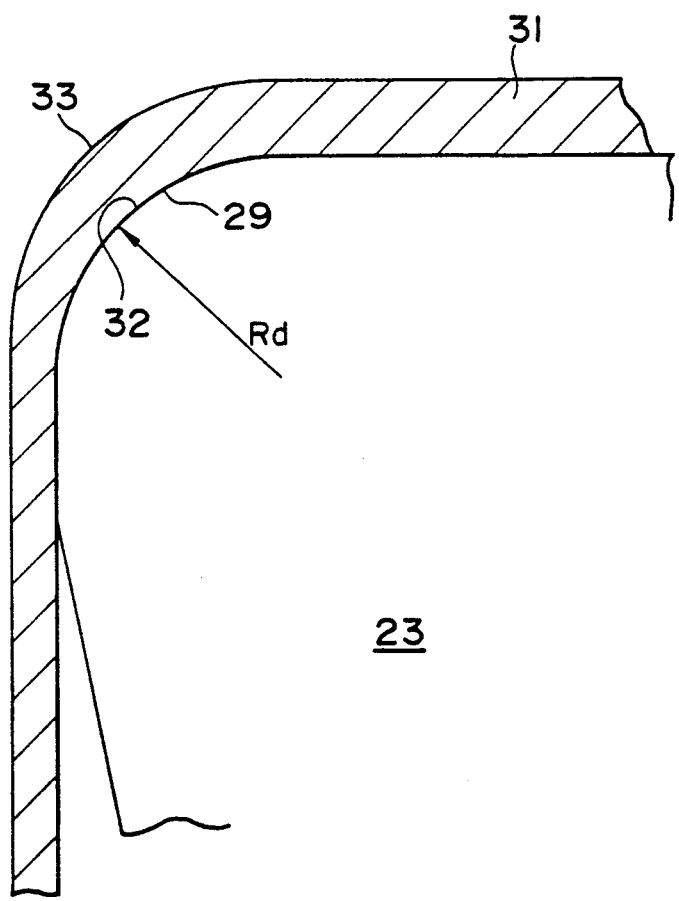
FIG. 9 is a diagram illustrating the principle of bending elongation.

Referring to FIG. 9 illustrating the principle of bending elongation, the coated metal plate 31 is forcibly bent under a sufficient back tension along the working corner 29 of the redrawing die having a curvature radius $R_D$. In this case, a strain is not produced in a surface 32 on the working corner of the coated metal plate 31, but a surface 33 on the side opposite to the working corner undergoes a strain by pulling. Supposing that the curvature radius of the working corner is $R_D$ and the plate thickness is t, this strain quantity $\epsilon_s$ is given by the following formula:

$$\epsilon_s = \frac{2\pi(R_D + t) - 2\pi R_D}{2\pi R_D} = \frac{t}{R_t} \quad (3)$$

The surface (inner surface) 33 of the coated metal plate is elongated by $\epsilon_s$ at the working corner, and the other surface (outer surface) 32 is elongated by a strain quantity $\epsilon'_s$ which is equal to $\epsilon_s$ ($\epsilon'_s = \epsilon_s$) by the back tension just below the acting corner. If strain quantity $\epsilon_s$ and strain quantity $\epsilon'_s$ appear alternately, a coarse surface having a pitch corresponding to the curvature radius $R_D$ is formed on the surface of the metal. However, the point of initiation of reduction of the thickness by bending elongation is different between the inner surface and the outer surface, and the coarse surface of the above-mentioned pitch appears substantially in a portion other than $R_D$ on the outer surface and the corresponding surface appears substantially in a portion of less than $R_D/2$ on the inner surface. This is especially conspicuous on the coated surface.

If the coated metal plate is thus bent and elongated, the thickness of the coated metal plate is reduced, and the thickness change ratio $\epsilon_t$ is given by the following formula:

$$\epsilon_t = \frac{-t}{R_D + t} \quad (4)$$

From the above formula (4), it is seen that decrease of the curvature radius $R_D$ of the working corner is effective for reducing the thickness of the coated metal plate. Namely, it is understood that as $R_D$ is decreased, the thickness change $|\epsilon_t|$ is increased. It will also be understood that supposing that the curvature radius $R_D$ is constant, as the thickness t of the coated metal plate is increased, the thickness change $|\epsilon_t|$ is increased.

In the production of a deep-draw-formed can according to the present invention, if the curvature radius $R_D$ of the working corner of the redrawing die is adjusted to a value 1 to 2.9 times, especially 1.5 to 2.9 times, the blank thickness $t_B$ of the metal plate, bending elongation can be effectively performed for forming the intended rough surface.

As another factor important for forming the rough surface, there can be mentioned the back tension and the dynamic friction coefficient ($\mu$) of the annular face 27 of the holding member 22 and the annular face of the redrawing die 23, and by adjusting these factors within certain ranges, the roughness of the metal surface can be adjusted to a desired level.

Good results can be obtained when the degree of the thickness of the side wall of the can, that is, the thickness reduction ratio, is 5 to 45%, especially 5 to 40%, of the blank thickness ($t_B$).

Effects of the Invention

The deep-draw-formed can of the present invention is formed of a metal plate having an organic coating, and the thickness of the barrel wall is reduced, as compared with the thickness of the bottom. Since the inner surface organic coating is composed of a crystalline thermoplastic resin and the crystalline thermoplastic resin is molecularly oriented mainly in the axial direction, and since the roughness of the metal surface of the barrel wall is made larger than that of the metal surface of the bottom, the covering completeness, adhesion, corrosion resistance and heat resistance of the coating are prominently improved.

Namely, by using a crystalline and molecularly oriented resin as the inner surface resin, the scratch resistance, corrosion resistance and heat resistance of the coating per se are prominently improved, the roughness of the metal surface of the barrel wall is increased, the organic resin coating covering the metal surface is molecularly oriented, and fine convexities and concavities (peaks troughs) of the metal surface are anchored in the oriented resin layer and by this anchoring effect, the adhesion is prominently improved. Furthermore, in the case where an adhesive is interposed, fine convexities and concavities are anchored in the adhesive layer, and the adhesion is further improved. Accordingly, the following advantages can be attained in this deep-draw-formed can. Namely, the deep-draw-formed can has an excellent resistance to the under-film corrosion and has a sufficient resistant to the post processing operation such as the necking operation, and the reduction of the adhesive force with the lapse of time is remarkably controlled.

EXAMPLES

The present invention will now be described in detail with reference to the following examples that by no means limit the scope of the invention.

The characteristics of vessels shown in the following examples and comparative examples were measured and evaluated according to methods described below.

(A) Ratio of Average Roughness

The resin coating of a thickness-reduced deep-draw-formed can was removed by using the solvent, and the average roughnesses of the barrel wall at the central part of the can height and the bottom were measured by a roughness meter.

(B) Pitch between Peak and Trough

The distance between the peak and trough in the roughness curve of the barrel wall at the central part of the can height, determined in (A) above, was measured.

(C) X-Ray Orientation Degree

The X-ray orientation degree was measured according to the method described hereinbefore.

(D) Crystallinity

The density of a resin coating sample was determined according to the density gradient tube method, and the crystallinity was calculated from the determined density according to the following formula:

$$\text{crystallinity} = \frac{\rho - \rho_a}{\rho_c - \rho_a} \times 100$$

wherein
$\rho$ represents the measured density (g/cm$^3$),
$\rho_a$ represents the density of a completely amorphous polymer, and $\rho_c$ represents the density of a completely crystalline polymer.
polyethylene terephthalate:
$\rho_a = 1.335$ g/cm$^3$
$\rho_c = 1.455$ g/cm$^3$
polyethylene:
$\rho_a = 0.855$ g/cm$^3$
$\rho_c = 1.001$ g/cm$^3$
polypropylene:
$\rho_a = 0.850$ g/cm$^3$
$\rho_c = 0.936$ g/cm$^3$ The sample used for the measurement of the X-ray orientation degree was used for the determination. The crystallinity of this sample was designated as the crystallinity of the coating.

(E) Formability

The presence or absence of formation of shock lines, the presence or absence of peeling (delamination) of a resin coating layer and the presence or absence of breaking of the resin coating layer were checked, and the metal exposure (enamel rater value, ERV) was measured.

(F) Corrosion Resistance

Cola (carbonated drink) was filled in a thickness-reduced deep-draw-formed can and a lid was seamed to the can. The can was stored at 37° C. for a long period, and the corrosion state of the inner face of the can and the leakage were examined.

(G) Heat Resistance

With respect to the thickness-reduced deep-draw-formed can having the outer surface printed and baked (200° C., 3 minutes), the damage of the coating layer by dinting was checked.

In the case where the heat resistance is evaluated, the X-ray orientation degree and crystallinity were determined with respect to the thermoplastic resin covering the printed can body.

EXAMPLE 1

A biaxially drawn polyethylene terephthalate/isophthalate copolyester film having a thickness of 20 μm was heat-bonded to both the surfaces of a tin-free steel (TFS) plate having a blank thickness of 0.18 mm and a tempering degree of DR-9 to form a metal plate having an organic coating. Palm oil was coated on this coated metal plate and the metal plate was punched into a disk having a diameter of 187 mm, and a shallow-formed cup was prepared from this disk according to customary procedures. The draw ratio at this draw-forming step was 1.4.

The cup was preliminarily heated at 80° C. and subjected to redraw forming at the subsequent primary, secondary and third redrawing steps. The forming conditions adopted at the primary, secondary and third redrawing steps were as follows.
Primary redraw ratio: 1.25
Secondary redraw ratio: 1.25
Third redraw ratio: 1.25
Curvature radius ($R_D$) of working corner of redrawing die: 0.40 mm
The characteristics of the obtained deep-draw-formed cup were as shown below.
Cup diameter: 66 mm
Cup height: 140 mm
Change ratio of thickness of side wall: −20%

Then, doming forming was carried out according to customary procedures, and the palm oil was removed by washing with water and trimming was then carried out. Then, necked and flanging were carried out. Thus, a thickness-reduced deep-draw-formed can was prepared.

The characteristics of this can and the evaluation results are shown in Table 1.

A thickness-reduced deep-draw-formed can having excellent corrosion resistance and heat resistance was obtained.

COMPARATIVE EXAMPLE 1

A thickness-reduced deep-draw-formed can was prepared by carrying out the formation in the same manner as described in Example 1 except that a polyvinyl organosol as an amorphous resin was coated in a thickness of 10 μm as the inner surface organic coating and a phenol/epoxy coating having a thickness of 4 μm was formed as the outer surface organic coating. The characteristics of the obtained can body and the evaluation results are shown in Table 1.

The obtained can was poor in the heat resistance and corrosion resistance and was not suitable as a vessel.

COMPARATIVE EXAMPLE 2

A thickness-reduced deep-draw-formed can having characteristics shown in Table 1 was prepared in the same manner as described in Example 1 except that a redrawing die having a curvature radius ($R_D$) of 0.1 mm in a working corner was used at the redrawing step and the thickness reduction ratio was changed to −3%. This can body of the present example, in which the thickness reduction ratio, the ratio of the average roughness of the metal surface of the barrel wall to the average roughness of the metal surface of the bottom and the peak/trough pitch on the metal surface were outside the ranges specified in the present invention, was poor in the corrosion resistance and heat resistance.

COMPARATIVE EXAMPLE 3

A thickness-reduced deep-draw-formed can having characteristics shown in Table 1 were prepared in the same manner as described in Example 1 except that an undrawn polyethylene terephthalate film having the same thickness was used instead of the biaxially drawn polyethylene terephthalate film. The can body obtained in the present example, in which the crystallinity of the resin on the barrel was outside the range specified in the present invention, was poor in the corrosion resistance.

EXAMPLE 2

A thickness-reduced deep-draw-formed can was prepared in the same manner as described in Example 1 except that a coated metal plate formed by heat-bonding a polypropylene film having a thickness of 20 μm to both the surfaces of an Al-Mn type aluminum alloy plate having a blank thickness of 0.26 mm through a urethane adhesive layer having a thickness of 2 μm was used and the curvature radius $R_D$ of the working corner of the redrawing die was changed to 0.60 mm. The obtained results are shown in Table 1. As is seen from the results shown in Table 1, a vessel having excellent formability and corrosion resistance was obtained.

COMPARATIVE EXAMPLE 4

A thickness-reduced deep-draw-formed can was prepared in the same manner as described in Example 1 except that a polyethylene films having the same thickness was heat-bonded through an acid-modified olefin adhesive layer having a thickness of 3 μm instead of the biaxially drawn polyethylene terephthalate film. The characteristics of the can body and the evaluation results are shown in Table 1. The can body of the present embodiment, in which the crystallinity of the resin of the barrel wall was outside the range specific in the present invention, was extremely poor in the corrosion resistance.

COMPARATIVE EXAMPLE 5

A mild steel plate having a blank thickness of 0.26 mm and a tempering degree of T-2, which had on one surface (thermoplastic resin coating surface) a lower plating layer of metallic chromium (150 mg/m$^2$) and an upper plating layer of chromium oxide hydrate (30 mg/m$^2$ as chromium) and on the other surface (surface not coated with a thermoplastic resin) a tin plating layer (2.0 g/m$^2$), was prepared. A coated metal plate was obtained by heat-bonding an undrawn polyethylene terephthalate having a thickness of 36 μm to one surface of the steel plate. The coated metal plate was draw-ironed under forming conditions described below so that the film-coated surface would be the inner surface of the final vessel. The characteristics of the draw-ironed vessel and the evaluation results are shown in Table 1. The vessel of the present example was poor in the corrosion resistance and heat resistance.

Forming Conditions
1. Temperature of coated metal plate before forming: 80° C.
2. Blank diameter: 135 mm
3. Drawing conditions:
   first draw ratio: 1.75
   second draw ratio: 1.35
4. Ironing punch diameter: 52.65 mm

EXAMPLE 3

A biaxially drawn ethylene terephthalate/adipate copolymer film having a thickness of 20 μm was bonded to one surface of a TFS plate having a blank thickness of 0.15 mm and a tempering degree of DR-9 and a phenol/epoxy coating was formed on the other surface. By using the coated metal plate, a thickness-reduced deep-draw-formed can was prepared in the same manner as described in Example 1 so that the polyethylene terephthalate/adipate film surface would be the inner surface. The characteristics of the obtained can body and the evaluation results are shown in Table 1. A vessel having excellent formability, heat resistance and corrosion resistance was obtained.

EXAMPLE 4

A biaxially drawn ethylene terephthalate/isophthalate film having a thickness of 20 μm was formed on one surface of a TFS plate having a blank thickness of 0.13 mm and a tempering degree of DR-9 through an epoxy adhesive layer having a thickness of 1 μm, and a biaxially drawn ethylene terephthalate/isophthalate copolymer film containing 50% by weight based on the resin of anatase type titanium dioxide was formed on the other surface of the steel plate through an epoxy type adhesive layer having a thickness of 1 μm. By using this coated metal plate, a thickness-reduced deep-draw-formed can was prepared in the same manner as described in Example 1 so that the surface of the titanium dioxide-containing film would be the outer surface of the final vessel. The characteristics of the obtained can and the evaluation results are shown in Table 1. A vessel having excellent formability, heat resistance and corrosion resistance was obtained.

TABLE 1

Characteristics of Deep-Draw-Formed Cans and Evaluation Results

| | Coated Plate | | | | Thickness | Ratio of |
| | | inner surface | | outer surface | | Reduction | Average |
| | plate material | organic resin | adhesive | organic resin | adhesive | Ratio (%) | Roughness |
| --- | --- | --- | --- | --- | --- | --- | --- |
| Example 1 | TFS, 0.18 mm | PET | | PET | | −20 | 2.0 |
| Comparative Example 1 | TFS, 0.18 mm | polyvinyl chloride | | phenol/ epoxy | | −20 | 2.0 |
| Comparative Example 2 | TFS, 0.18 mm | PET | | PET | | −3 | 1.0 |
| Comparative Example 3 | TFS, 0.18 mm | PET | | PET | | −20 | 1.8 |
| Example 2 | aluminium, 0.26 mm | PP | urethane adhesive | PP | urethane adhesive | −10 | 3.0 |
| Comparative Example 4 | TFS, 0.18 mm | PE | *1 olefin adhesive | PE | *1 olefin adhesive | −20 | 2.5 |
| Comparative Example 5 | tinplate 0.26 mm | PET | | | | −50 | 1.0 |
| Example 3 | TFS, 0.15 mm | PET/A | | phenol/ epoxy | | −25 | 2.1 |
| Example 4 | TFS, 0.13 mm | PET/I | | PET/I | | −30 | 2.1 |

| | Peak/ Trough Pitch | X-Ray Orientation Degree | Crystallinity | Formability | Corrosion Resistance | Heat Resistance |
| --- | --- | --- | --- | --- | --- | --- |
| Example 1 | 0.1 | 50 | 35 | no change | no change | no change |
| Comparative Example 1 | 0.1 | 0 | 0 | no change | blister, UFC | breaking of film |

TABLE 1-continued

| | | | | | | |
|---|---|---|---|---|---|---|
| Comparative Example 2 | 0.01 | 30 | 30 | no change | blister, UFC | rising of film |
| Comparative Example 3 | 0.1 | 35 | 10 | no change | blister, UFC | not evaluated |
| Example 2 | 0.4 | 60 | 50 | no change | no change | not evaluated |
| Comparative Example 4 | 0.4 | 93 | 80 | shock lines | *2 | not evaluated |
| Comparative Example 5 | 2.0 | 80 | 50 | no change | *3 | rising of film |
| Example 3 | 0.12 | 70 | 30 | no change | no change | no change |
| Example 4 | 0.08 | 80 | 60 | no change | no change | no change |

Note
*1: acid-modified olefin adhesive
*2: corrosion and leakage in seamed portion
*3: corrosion on entire surface, pitting, leakage

What is claimed is:

1. A deep-draw-formed metal can prepared from a metal plate having an organic coating, wherein
   the can is prepared by bending elongation by a curvature corner portion of a redrawing die,
   at least an organic coating on the inner surface is composed of a crystalline thermoplastic resin,
   the thickness of a barrel wall is reduced as compared with the thickness of a bottom,
   a thermoplastic resin on the barrel wall is molecularly oriented mainly in the axial direction,
   the roughness of the metal surface of the barrel wall is larger than that of the metal surface of the bottom and
   the radius of curvature of a working corner of the redrawing die is 1 to 2.9 times the blank thickness of the metal plate.

2. A deep-draw-formed can as set forth in claim 1, wherein the average roughness of the metal surface of the barrel wall is at least 1.5 times the average roughness of the metal surface of the bottom.

3. A deep-draw-formed can as set forth in claim 1, wherein a rough surface of a pitch/trough pitch of 0.02 to 1.5 $\mu$m is formed on the surface of the barrel wall.

4. A deep-draw-formed can as set forth in claim 1, wherein the orientation degree, determined by the X-ray diffraction method, of the thermoplastic resin of the barrel wall is at least 30%.

5. A deep-draw-formed can as set forth in claim 1, wherein the crystallinity, determined by the density method, of the thermoplastic resin of the barrel wall is at least 15%.

6. A deep-draw-formed can as set forth in claim 1, wherein the thickness reduction ratio of the barrel wall is 5 to 45%.

7. A deep-draw-formed can as set forth in claim 1, wherein the crystalline thermoplastic resin is coated through an adhesive.

8. A deep-draw-formed metal plate can having an organic coating, wherein at least an organic coating on the inner surface is composed of a crystalline thermoplastic resin, the thickness of a barrel wall is reduced as compared with the thickness of a bottom so that the thickness reduction ratio of the barrel wall is 5 to 45%, the thermoplastic resin on the barrel wall is molecularly oriented mainly in the axial direction so that the orientation degree, determined by the X-ray diffraction method, of the thermoplastic resin is at least 30% and the thermoplastic resin on the barrel wall has a crystallinity, determined by the density method, of at least 15%, and the roughness of the metal surface of the barrel wall is larger than that of the metal surface of the bottom and the average roughness of the metal surface is at least 1.5 times the average roughness of the metal surface of the bottom.

9. A deep-draw-formed can as set forth in claim 8, wherein said crystalline thermoplastic resin comprises polyethylene terephthalate, an ethylene terephthalate/isophthalate copolymer, polybutylene terephthalate, or an ethylene terephthalate/sebacate copolymer.

10. A deep-draw-formed can as set forth in claim 8, wherein said crystalline thermoplastic resin comprises polypropylene.

* * * * *